United States Patent
Zhong et al.

(10) Patent No.: US 12,254,908 B2
(45) Date of Patent: Mar. 18, 2025

(54) SYSTEM FOR CONTROLLING A CRITICAL DIMENSION (CD) UNIFORMITY OF A MAGNETIC HEAD DEVICE

(71) Applicant: Headway Technologies, Inc., Milpitas, CA (US)

(72) Inventors: Tom Zhong, Saratoga, CA (US); Hiroshi Omine, Santa Clara, CA (US); Jianing Zhou, Fremont, CA (US); Kunliang Zhang, Fremont, CA (US); Ruhang Ding, Pleasanton, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/215,679

(22) Filed: Jun. 28, 2023

(65) Prior Publication Data

US 2023/0343362 A1 Oct. 26, 2023

Related U.S. Application Data

(63) Continuation of application No. 17/364,300, filed on Jun. 30, 2021, now Pat. No. 11,715,491.

(51) Int. Cl.
*G11B 5/127* (2006.01)
*G11B 5/31* (2006.01)
*G11B 5/48* (2006.01)
*H04R 31/00* (2006.01)

(52) U.S. Cl.
CPC ............ *G11B 5/484* (2013.01); *G11B 5/3163* (2013.01)

(58) Field of Classification Search
CPC .............................. G11B 5/3163; G11B 5/484
See application file for complete search history.

(56) References Cited

U.S. PATENT DOCUMENTS

| | | | |
|---|---|---|---|
| 8,233,248 B1 | 7/2012 | Li et al. | |
| 8,728,333 B2 | 5/2014 | Wang et al. | |
| 10,333,063 B1* | 6/2019 | Kim | C09D 183/10 |
| 11,715,491 B2 | 8/2023 | Zhong et al. | |
| 2011/0079939 A1 | 4/2011 | Lammers et al. | |
| 2014/0116984 A1 | 5/2014 | Ding et al. | |
| 2014/0170774 A1* | 6/2014 | Mao | G11B 5/3909 438/3 |
| 2020/0300940 A1* | 9/2020 | Isler | G01R 33/0052 |

OTHER PUBLICATIONS

Office Action in U.S. Appl. No. 17/364,300, dated Nov. 15, 2022.
Notice of Allowance in U.S. Appl. No. 17/364,300, dated Mar. 16, 2023.

* cited by examiner

*Primary Examiner* — Paul D Kim
(74) *Attorney, Agent, or Firm* — DLA Piper LLP (US)

(57) ABSTRACT

Systems and methods for controlling a critical dimension (CD) uniformity of a magnetic head device are described. A film stack that is part of a system for controlling a critical dimension (CD) uniformity of a magnetic head device can include a substrate, a magnetoresistive (MR) sensor layer, and a hard mask layer. The system can also include a first mask that defines critical shape patterns other than the CD. The hard mask layer can be patterned using the first mask. The system can also include a second mask that defines the CD. A mandrel pattern can be formed on the hard mask layer using the second mask.

17 Claims, 4 Drawing Sheets

SYSTEM FOR CONTROLLING A CRITICAL DIMENSION (CD) UNIFORMITY OF A MAGNETIC HEAD DEVICE

CROSS REFERENCE TO RELATED APPLICATIONS

This application is a continuation of U.S. application Ser. No. 17/364,300, filed Jun. 30, 2021, now U.S. Pat. No. 11,715,491, the entire disclosure of which is hereby incorporated by reference.

TECHNICAL FIELD

Embodiments of the present disclosure relate generally to magnetoresistive recording heads for the hard disk drive (HDD) industry. More specifically, embodiments of the present disclosure relate to methods for ultra-fine critical dimension (CD) patterning for magnetic head devices that achieves significant CD uniformity and scaling capability.

BACKGROUND

One of the major challenges in the hard disk drive (HDD) industry is to scale down the critical dimension of magnetoresistive (MR) sensors to meet the demand for higher areal density data recording. Conventional patterning technique to create an ultra-fine CD can no longer meet the demands in within-wafer and wafer-to-wafer uniformity control.

For example, in a conventional approach to fabricating a small CD MR sensor, a resist pattern is often used to pattern the sensor. The resist patterns and subsequently transferred patterns go through excessive trimming processes with either RIE or IBE techniques to achieve the desired CD sizes. However, due to resist pattern edge roughness, CD uniformity control cannot be met after such excessive trimming processes. Similar challenges are faced in other areas of HDD head processes.

Thus, there is a need for a method for ultra-fine CD patterning for magnetic head devices that achieves significant CD uniformity and scaling capability.

SUMMARY

Broadly, embodiments of the present disclosure provide methods for ultra-fine CD patterning for magnetic head devices that achieve significant CD uniformity and scaling capability. According to some embodiments of the present disclosure, a method for critical dimension (CD) uniformity control can comprise providing a film stack, the film stack including a substrate, a magnetoresistive (MR) sensor layer, and a hard mask layer, patterning the hard mask layer using a first mask that defines critical shape patterns other than a CD, forming a mandrel pattern using a second mask that defines the CD, and forming a sidewall spacer pattern on sidewalls of the mandrel pattern, and removing the mandrel pattern.

According to some embodiments of the present disclosure, patterning the hard mask layer includes applying a photoresist layer over the hard mask layer.

According to some embodiments of the present disclosure, patterning the hard mask layer includes applying a photoresist layer over the hard mask layer.

According to some embodiments of the present disclosure, patterning the hard mask layer includes exposing the photoresist layer to a light source through the first mask.

According to some embodiments of the present disclosure, patterning the hard mask layer includes developing the photoresist layer to form a resist pattern.

According to some embodiments of the present disclosure, patterning the hard mask layer includes etching to pattern the hard mask layer and removing any remaining portions of the photoresist layer.

According to some embodiments of the present disclosure, forming the mandrel pattern includes depositing a mandrel material layer.

According to some embodiments of the present disclosure, forming the mandrel pattern includes forming a resist pattern using the second mask.

According to some embodiments of the present disclosure, forming the mandrel pattern includes etching the mandrel material layer using the resist pattern as an etch mask, thereby forming the mandrel pattern.

According to some embodiments of the present disclosure, forming the sidewall spacer pattern on sidewalls of the mandrel pattern includes depositing a conformal layer of spacer material by atomic layer deposition (ALD) on the mandrel pattern.

According to some embodiments of the present disclosure, forming the sidewall spacer pattern on sidewalls of the mandrel pattern includes etching the conformal layer of spacer material, thereby forming the sidewall spacer pattern.

According to some embodiments of the present disclosure, depositing the conformal layer of spacer material is by low-temperature ALD.

According to some embodiments of the present disclosure, depositing the conformal layer of spacer material is by high-temperature ALD.

According to some embodiments of the present disclosure, forming the mandrel pattern includes resist-less pattern forming with the second mask, thereby forming the mandrel pattern.

According to some embodiments of the present disclosure, the hard mask layer includes an outermost component layer, a middle component layer, and an innermost layer.

According to some embodiments of the present disclosure, the hard mask component layers are chosen to permit etching of the outermost component layer without etching through the middle component layer, and to allow selective etching of the middle component layer without etching through the innermost component layer.

According to some embodiments of the present disclosure, patterning the hard mask layer includes patterning the outermost component layer.

According to some embodiments of the present disclosure, the method further comprises transferring a pattern on the outermost component layer resulting from the patterning the hard mask layer, the forming the mandrel pattern, and the forming of the sidewall spacer pattern, to the middle component layer and innermost component layer by selective etching.

According to some embodiments of the present disclosure, transferring the pattern on the outermost component layer to the middle component layer and innermost component layer includes transferring the pattern on the outermost component layer to the middle component layer by selective etching that stops on the innermost component layer.

According to some embodiments of the present disclosure, transferring the pattern on the outermost component layer to the middle component layer and innermost component layer includes transferring the pattern on the middle component layer to the innermost component layer by selective etching that stops on the on the MR sensor layer.

BRIEF DESCRIPTION OF THE DRAWINGS

The accompanying drawings, which are incorporated in and constitute a part of this specification, exemplify various embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not generally drawn to scale.

DETAILED DESCRIPTION

A method for critical dimension (CD) uniformity control for magnetic head devices is provided. Those of skill in the art will recognize that other steps may be employed and in varying order and that the inventions disclosed herein are not limited to such, but that the above definition is provided for convenience and ease of description.

Figure 2A:
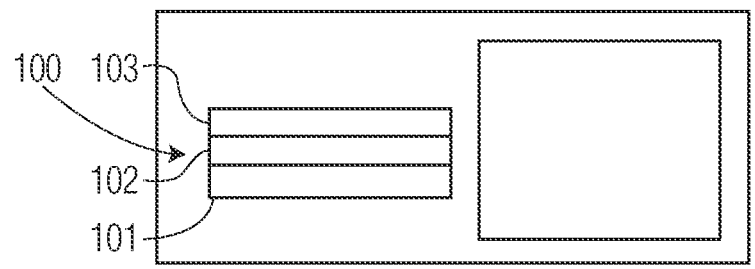
FIG. 2(a) shows a cross-sectional view and a top view of an exemplary film stack having one hard mask layer, according to some embodiments of the present disclosure.

In some embodiments, the method includes providing a film stack 100 as shown in FIG. 2(a). In some embodiments, the film stack includes a substrate 101, a MR sensor layer 102, and a hard mask layer 103.

The substrate 101 can be any suitable substrate known in the art for the HDD industry. The substrate is a structural substrate having mechanical strength to support the overlying layers. Substrates used are generally metal, glass, or a carbon material such as a polymer or composite, and may be metal alloys or composite glass materials such as glass/ceramic blends. The substrate is generally magnetically impermeable with diamagnetic, or only very weak paramagnetic, properties.

The MR sensor layer 102 can be any suitable MR sensor layer known in the art. In some embodiments, a MR sensor layer 102 includes two ferromagnetic layers which are separated by a non-magnetic conductive layer in the sensor stack. One of the ferromagnetic layers is a pinned layer wherein the magnetization direction is fixed by exchange coupling with an adjacent anti-ferromagnetic (AFM) pinning layer. The second ferromagnetic layer is a free layer wherein the magnetization vector can rotate in response to external magnetic fields. In the absence of an external magnetic field, the magnetization direction of the free layer is aligned perpendicular to that of the pinned layer by the influence of hard bias layers on opposite sides of the sensor stack. When an external magnetic field is applied by passing the sensor over a recording medium along an air bearing surface (ABS), the free layer magnetic moment may rotate to a direction which is parallel to that of the pinned layer which is a lower resistance state than in the perpendicular alignment. In some embodiments, the two ferromagnetic layers are separated by a thin non-magnetic dielectric layer.

The hard mask layer 103 can be formed from one or more layers of any suitable material or combination of materials. The hard mask layer 103 can be deposited by any suitable method. Preferably, the hard mask layer is deposited by physical vapor deposition (PVD), chemical vapor deposition (CVD), plasma enhanced CVD (PECVD), or atomic layer deposition (ALD).

In some embodiments, the hard mask layer 103 is one layer as shown in FIG. 2(a). In some embodiments, the hard mask layer 103 composes $SiO_2$ or high-k material, wherein the high-k materials include, but are not limited to, silicon nitride, silicon oxynitride, hafnium oxide ($HfO_2$), hafnium silicon oxide (HfSiO), hafnium silicon oxynitride (HfSiON), hafnium tantalum oxide (HMO), hafnium titanium oxide (HfTiO), hafnium zirconium oxide (HfZrO), metal oxides, metal nitrides, metal silicates, transition metal-oxides, transition metal-nitrides, transition metal-silicates, oxynitrides of metals, metal aluminates, zirconium silicate, zirconium aluminate, zirconium oxide, titanium oxide, aluminum oxide, hafnium dioxide-alumina ($HfO_2$-$Al_2O_3$) alloy, and/or combinations thereof.

Figure 2B:
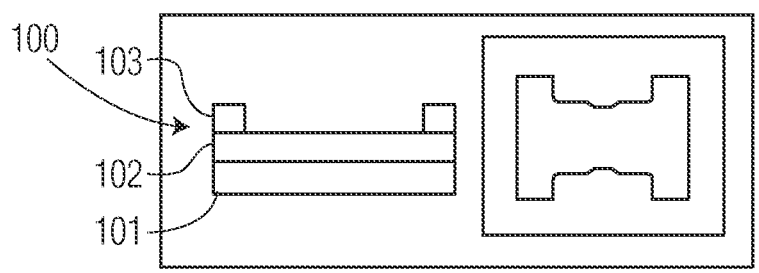
FIG. 2(b) shows a cross-sectional view and a top view of patterning the hard mask layer.

In some embodiments, the method includes patterning the hard mask layer 103 using a first mask to define the critical shape patterns other than the CD as shown in FIG. 2(b). In some embodiments, patterning the hard mask layer 103 includes applying a photoresist layer over the hard mask layer 103. In some embodiments, the photoresist layer includes a photoresist and a bottom anti-reflective coating (BARC), a photoresist with silicon content, or a BARC with spin on carbon. In some embodiments, the photoresist layer is formed by spin coating.

Figure 1A:
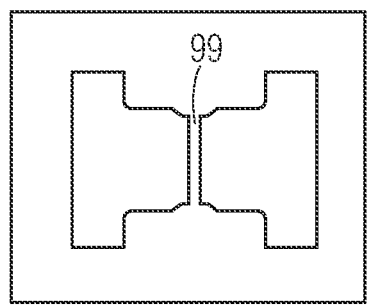
FIG. 1(a) shows a top view of a conventional mask layout for conventional methods for creating a CD.
Figure 1B:
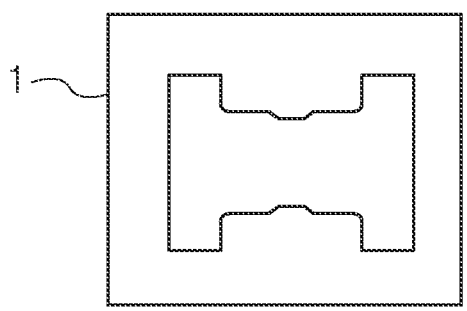
FIGS. 1(b) and 1(c) show a top view of two mask layouts for methods for creating an ultra-fine CD, according to some embodiments of the present disclosure. Two masks like the exemplary ones illustrated in FIGS. 1(b) and 1(c) allow the formation of the CD pattern part to be decoupled from the formation of the other critical shape patterns and the CD to be scaled down to 20 nm or less with tight CD uniformity control, according to some embodiments of the present disclosure.

In some embodiments, patterning the hard mask layer 103 includes exposing the photoresist layer to a light source through a first mask (e.g., photomask) like the mask 1 illustrated in FIG. 1(b). After exposure to the light source, the photoresist layer can then be developed, forming a resist pattern. The hard mask layer 103 can then be etched (e.g., by a dry etch, such as plasma etching) to pattern the hard mask layer 103 and the remaining portions of the photoresist layer can be removed. In some embodiments, the plasma etching can use a plasma of reactive gases such as fluorocarbons, oxygen, chlorine, boron trichloride, optionally with nitrogen, argon, helium or other gas.

Figure 1C:
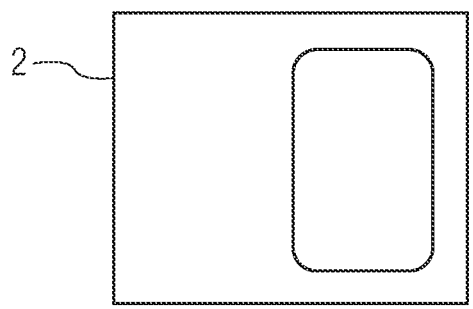
Figure 2C:
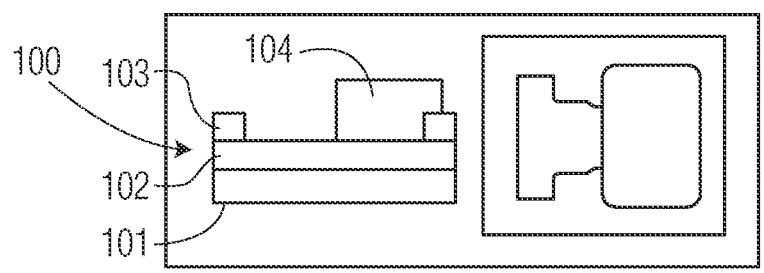
FIG. 2(c) shows a cross-sectional view and a top view of forming a mandrel pattern.

In some embodiments, the method further includes forming a mandrel pattern 104 as shown in FIG. 2(c) using a second mask to define the CD 99 shown in FIG. 1(a) that requires tight CD control. In some embodiments, the formation of the mandrel pattern 104 includes depositing a mandrel material layer, such as a dielectric material (e.g., silicon oxide, silicon nitride, or any other suitable material discussed herein), forming a resist pattern using a second mask (e.g., photomask) like the mask 2 illustrated in FIG. 1(c), and etching the mandrel material layer using the resist layer as an etch mask, thereby forming the mandrel pattern 104. The resist pattern includes a resist material sensitive to a radiation beam and is formed by a lithography process. In some embodiments, the lithography process includes coating a resist layer on the mandrel material layer, performing a lithography exposure process to the resist layer according to the second mask, developing the exposed resist layer to form the resist pattern.

In some embodiments, a resist is not necessary and forming the mandrel pattern 104 can be formed directly using resist-less pattern formation techniques with the second mask like the mask 2 illustrated in FIG. 1(c) like soft lithography, Dip-Pen nanolithography, and evaporation through a shadow mask or stencil.

Figure 2D:
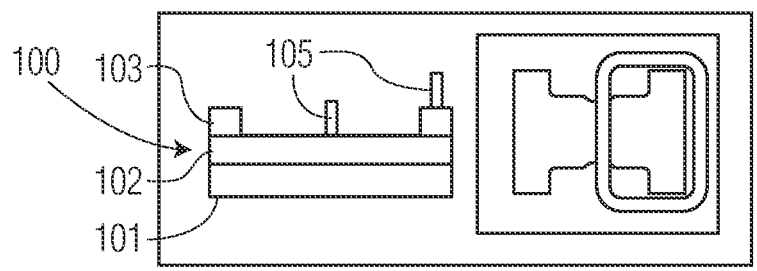
FIG. 2(d) shows a cross-sectional view and a top view of forming a sidewall spacer pattern.

In some embodiments, forming a sidewall spacer pattern 105 on sidewalls of the mandrel pattern 104 and (removing the mandrel pattern 104) as shown in FIG. 2(d). In some embodiments, forming the sidewall spacer pattern 105 is by a self-aligned ALD spacer patterning step. In some embodiments, the formation of the sidewall spacer pattern 105 includes depositing a conformal layer of spacer material on the mandrel pattern 104, and thereafter etching (e.g., by a wet etch or a dry etch, such as plasma etching) the conformal layer of spacer material, thereby forming the sidewall spacer pattern 105. The conformal layer of spacer material may include a dielectric material (such as silicon oxide, silicon nitride, silicon carbide) or any materials discussed herein but is different from the mandrel material layer to achieve etching selectivity during the etch. In some embodiments, the conformal layer of spacer material is deposited by ALD.

In some embodiments, the conformal layer can be deposited by high temperature ALD. In some embodiments, by "high temperature" it is meant that the temperature of the deposition process ranges from greater than 150° C., greater than 200° C., greater than 250° C., greater than 300° C., greater than 350° C., greater than 400° C., greater than 450° C., 500° C. to 1000° C., or 500° C. to 800° C., 500° C. to 750° C., 550° C. to 750° C., 600° C. to 750° C.; or 600° C. to 800° C. Materials for high temperature ALD include carbon for Al2O3 ALD, SiO2 ALD, SiON ALD, Al2O3 for SiO2 ALD, and SiO2 with Al2O3 ALD. For some embodiments, carbon can be removed by oxygen RIE etch, Al2O3 can be removed by alkali solution wet etch, and SiO2 by HF wet etch. Preferably, when the conformal layer is deposited by high temperature ALD, a resist is not used and the mandrel pattern can be formed directly using resist-less pattern formation techniques with the second mask like the mask 2 illustrated in FIG. 1(c) like soft lithography, Dip-Pen nanolithography, and evaporation through a shadow mask or stencil In some embodiments, the conformal layer can be deposited by low temperature ALD. In some embodiments, by "low temperature" it is meant that the temperature of the deposition process ranges from less than 400° C., less than 300° C., less than 200° C., less than 150° C., less than 100° C., 25-200° C., preferably from 100-200° C., 25-150° C., and 100-150° C. Preferably, by "low temperature" it is meant that the temperature of the deposition process is less than 150° C. Preferably, the temperature of the deposition process is lower than the glass transition temperature of the mandrel pattern such that the mandrel pattern will not deform during ALD deposition.

In some embodiments, the method further includes removing the mandrel pattern 104 as shown in FIG. 2(d). The mandrel pattern 104 is removed by an etch process that selectively removes the mandrel material layer but substantially does not etch the conformal layer of spacer material.

Figure 3A:
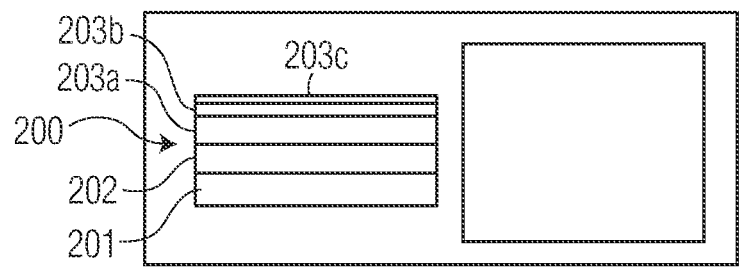
FIG. 3(a) shows a cross-sectional view and a top view of an exemplary film stack having three hard mask layers, according to some embodiments of the present disclosure.

Also provided is a second method for critical dimension (CD) uniformity control for magnetic head devices. In some embodiments, the method includes providing a film stack 200 as shown in FIG. 3(a). In some embodiments, the film stack includes a substrate 201, a MR sensor layer 202, and a hard mask layer 203.

The substrate 201 can be any suitable substrate known in the art for the HDD industry. The substrate is a structural substrate having mechanical strength to support the overlying layers. Substrates used are generally metal, glass, or a carbon material such as a polymer or composite, and may be metal alloys or composite glass materials such as glass/ceramic blends. The substrate is generally magnetically impermeable with diamagnetic, or only very weak paramagnetic, properties.

The MR sensor layer 202 can be any suitable MR sensor layer known in the art. In some embodiments, a MR sensor layer 202 includes two ferromagnetic layers which are separated by a non-magnetic conductive layer in the sensor stack. One of the ferromagnetic layers is a pinned layer wherein the magnetization direction is fixed by exchange coupling with an adjacent anti-ferromagnetic (AFM) pinning layer. The second ferromagnetic layer is a free layer wherein the magnetization vector can rotate in response to external magnetic fields. In the absence of an external magnetic field, the magnetization direction of the free layer is aligned perpendicular to that of the pinned layer by the influence of hard bias layers on opposite sides of the sensor stack. When an external magnetic field is applied by passing the sensor over a recording medium along an air bearing surface (ABS), the free layer magnetic moment may rotate to a direction which is parallel to that of the pinned layer which is a lower resistance state than in the perpendicular alignment. In some embodiments, the two ferromagnetic layers are separated by a thin non-magnetic dielectric layer.

The hard mask layer 203 can be formed from one or more layers of any suitable material or combination of materials. The hard mask layer 203 can be deposited by any suitable method. Preferably, the hard mask layer is deposited by physical vapor deposition (PVD), chemical vapor deposition (CVD), plasma enhanced CVD (PECVD), or atomic layer deposition (ALD).

In some embodiments, the hard mask layer 203 is three layers as shown in FIG. 3(a). The hard mask layer 203 includes three hard mask components layers—an outermost hard mask component layer 203a, a middle hard mask component layer 203b, and an innermost hard mask component layer 203c. The hard mask component layers are chosen to permit etching of the outermost component layer 203c without etching through the middle component layer 203b, and to allow selective etching of the middle component layer 203b without etching through the innermost component layer 203a. In some embodiments, the component layers 203a, 203b, and 203c comprise dielectrics, such as SiN, SiO2, MgO, SiON, SmOx, TiN, or Al2O3, and metallic materials, such as Ru, Ta, W, NiFe, CoFe, Ti, TiN, or TaN, deposited by PVD, CVD, PECVD, or ALD, in which selection of the materials for the component layers 103a, 103b, and 103c need to have excellent etch selectivity against subsequent etch processes.

Figure 3B:
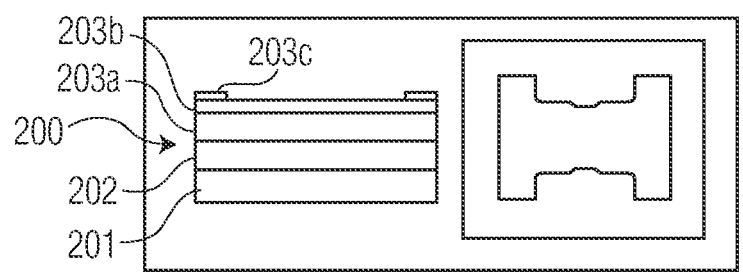
FIG. 3(b) shows a cross-sectional view and a top view of patterning the outermost hard mask component layer.

In some embodiments, the method includes patterning the outermost hard mask component layer 203c as shown in FIG. 3(b) using a first mask to define the critical shape patterns other than the CD. In some embodiments, patterning the outermost hard mask component layer 203c includes applying a photoresist layer over the outermost hard mask component layer 203c. In some embodiments, the photoresist layer includes a photoresist and a bottom anti-reflective coating (BARC), a photoresist with silicon content, or a BARC with spin on carbon. In some embodiments, the photoresist layer is formed by spin coating.

In some embodiments, patterning the outermost hard mask component layer 203c includes exposing the photoresist layer to a light source through a first mask 1 (e.g., photomask) as shown in FIG. 1(b). After exposure to the light source, the photoresist layer can then be developed, forming a resist pattern. The outermost hard mask component layer 203c can then be etched (e.g., by a dry etch, such as plasma etching) to pattern the outermost hard mask component layer 203c and the remaining portions of the photoresist layer can be removed. In some embodiments, the plasma etching can use a plasma of reactive gases such as fluorocarbons, oxygen, chlorine, boron trichloride, optionally with nitrogen, argon, helium or other gas.

Figure 3C:
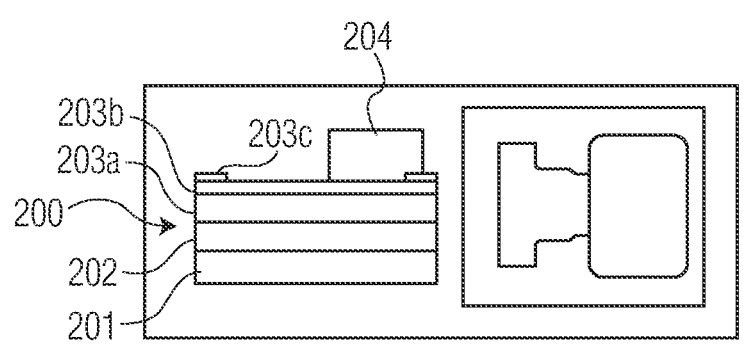
FIG. 3(c) shows a cross-sectional view and a top view of forming a mandrel pattern.

In some embodiments, the method further includes forming a mandrel pattern 204 as shown in FIG. 3(c) using a second mask to define the CD shown in FIG. (1a) that requires tight CD control. In some embodiments, the formation of the mandrel pattern 204 includes depositing a mandrel material layer, such as a dielectric material (e.g., silicon oxide, silicon nitride, or any other suitable material discussed herein), forming a resist pattern using a second mask (e.g., photomask) like the mask 1 illustrated in FIG. 1(b), and etching the mandrel material layer using the resist layer as an etch mask, thereby forming the mandrel pattern 204. The resist pattern includes a resist material sensitive to a radiation beam and is formed by a lithography process. In some embodiments, the lithography process includes coating a resist layer on the mandrel material layer, performing a lithography exposure process to the resist layer according to the second photomask, developing the exposed resist layer to form the resist pattern.

Figure 3D:
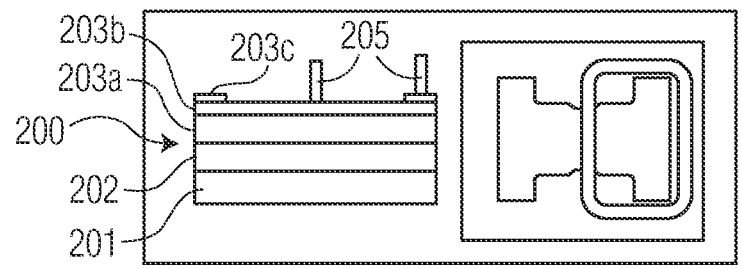
FIG. 3(d) shows a cross-sectional view and a top view of forming a sidewall spacer pattern.

In some embodiments, the method includes forming a sidewall spacer pattern 205 on sidewalls of the mandrel pattern 204 (and removing the mandrel pattern) as shown in FIG. 3(d). In some embodiments, forming the sidewall spacer pattern 205 is by a self-aligned ALD spacer patterning step. In some embodiments, the formation of the sidewall spacer pattern 205 includes depositing a conformal layer of spacer material on the mandrel pattern 204, and thereafter etching (e.g., by a wet etch or a dry etch, such as plasma etching) the conformal layer of spacer material, thereby forming the sidewall spacer pattern 205. The conformal layer of spacer material may include a dielectric material (such as silicon oxide, silicon nitride, silicon carbide) or any materials discussed herein but is different from the mandrel material layer to achieve etching selectivity during the etch. In some embodiments, the conformal layer of spacer material is deposited by ALD.

In some embodiments, the conformal layer can be deposited by high temperature ALD. In some embodiments, by "high temperature" it is meant that the temperature of the deposition process ranges from greater than 150° C., greater than 200° C., greater than 250° C., greater than 300° C., greater than 350° C., greater than 400° C., greater than 450° C., 500° C. to 1000° C., or 500° C. to 800° C., 500° C. to 750° C., 550° C. to 750° C., 600° C. to 750° C.; or 600° C. to 800° C. Materials for high temperature ALD include carbon for Al2O3 ALD, SiO2 ALD, SiON ALD, Al2O3 for SiO2 ALD, and SiO2 with Al2O3 ALD. For some embodiments, carbon can be removed by oxygen RIE etch, Al2O3 can be removed by alkali solution wet etch, and SiO2 by HF wet etch. Preferably, when the conformal layer is deposited by high temperature ALD, a resist is not used and the mandrel pattern can be formed directly using resist-less pattern formation techniques with the second mask like the mask 2 illustrated in FIG. 1(c) like soft lithography, Dip-Pen nanolithography, and evaporation through a shadow mask or stencil In some embodiments, the conformal layer can be deposited by low temperature ALD. In some embodiments, by "low temperature" it is meant that the temperature of the deposition process ranges from less than 400° C., less than 300° C., less than 200° C., less than 150° C., less than 100° C., 25-200° C., preferably from 100-200° C., 25-150° C., and 100-150° C. Preferably, by "low temperature" it is meant that the temperature of the deposition process is less than 150° C. Preferably, the temperature of the deposition process is lower than the glass transition temperature of the mandrel pattern such that the mandrel pattern will not deform during ALD deposition.

In some embodiments, the method further includes removing the mandrel pattern 204 as shown in FIG. 3(d). The mandrel pattern 204 is removed by an etch process that selectively removes the mandrel material layer but substantially does not etch the conformal layer of spacer material.

Figure 3E:
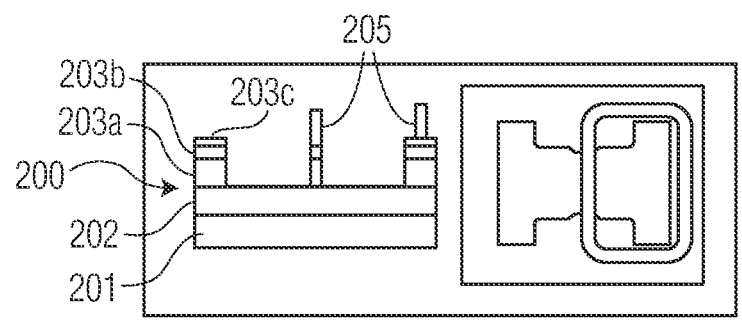
FIG. 3(e) shows a cross-sectional view and a top view of transferring the pattern on the outermost hard mask layer to the other two hard mask layers.

In some embodiments, the method further includes transferring the pattern resulting from the prior steps (e.g., patterning the outermost hard mask component layer 203c, forming the mandrel pattern 204, and forming of the sidewall spacer pattern 205) on the outermost hard mask component layer 203c to the hard mask component layers 203b, 203a by selective etching, as shown in FIG. 3(e). In some embodiments, transferring the pattern on the hard mask layer 203c to the hard mask component layers 203b, 203a includes transferring the pattern on the hard mask layer 203c to the hard mask component layer 203b by selective etching that stops on the hard mask component layer 203a. In some embodiments, etching is a plasma etching that uses a plasma of reactive gases such as fluorocarbons, oxygen, chlorine, boron trichloride, optionally with nitrogen, argon, helium or other gas that has a high selectivity to exposed regions of the hard mask layer 203b. In some embodiments, plasma etching uses a plasma including fluorocarbons that has a high selectivity to exposed regions of the hard mask component layer 203b.

In some embodiments, transferring the pattern on the hard mask component layer 203c to the hard mask layers 203b, 203a further includes transferring the pattern on the hard mask component layer 203b to the hard mask component layer 203a by selective etching that stops on the MR sensor layer 202. In some embodiments, etching is a plasma etching that uses a plasma of reactive gases such as fluorocarbons, oxygen, chlorine, boron trichloride, optionally with nitrogen, argon, helium or other gas that has a high selectivity to exposed regions of the hard mask layer 203a. In some embodiments, plasma etching uses a plasma including one or more gases comprised of C, H, and O such as $CH_3OH$, $C_2H_5OH$, or $CO/NH_3$ that has a high selectivity to exposed regions of the hard mask layer 203a.

Figure 3F:
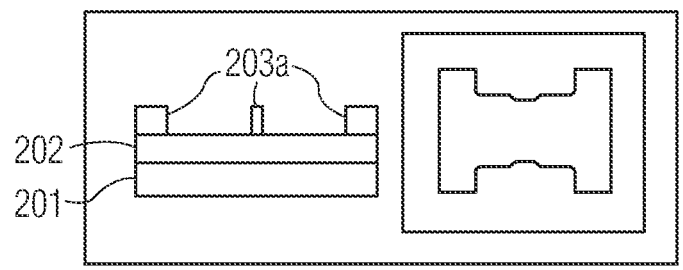
FIG. 3(f) shows a cross-sectional view and a top view of removing the layers above the innermost hard mask component layer and leaving only the innermost hard mask layer above the MR sensor layer.

In some embodiments, the method optionally further includes removing hard mask component layers 203c, 203b and the sidewall spacer pattern 205, leaving only the hard mask layer 203a on the MR sensor layer 202, as shown in FIG. 3(f). Removing hard mask component layers 203c, 203b and the sidewall spacer pattern 205 can be done by any method discussed herein or any suitable method known in the art.

Without being bound to any particular theory, the methods as described herein use two masks like the ones illustrated in FIGS. 1(b) and 1(c) and a sidewall spacer pattern formation step, allowing the formation of the CD pattern part to be decoupled from the formation of the other critical shape patterns and the CD to be scaled down to 20 nm or less with tight CD uniformity control, which cannot be achieved in conventional methods.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A system for controlling a critical dimension (CD) uniformity of a magnetic head device, the system comprising:
    a film stack including:
        a substrate;
        a magnetoresistive (MR) sensor layer; and
        a hard mask layer;
    a first mask that defines critical shape patterns other than the CD, wherein the hard mask layer is patterned using the first mask; and
    a second mask that defines the CD, wherein a mandrel pattern is formed on the hard mask layer using the second mask.

2. The system of claim 1, wherein a sidewall spacer pattern is formed on at least one sidewall of the mandrel pattern.

3. The system of claim 1, wherein the mandrel pattern is configured to be removed after the mandrel pattern is formed on the hard mask layer.

4. The system of claim 1, further comprising:
    a photoresist layer over the hard mask layer, wherein patterning the hard mask layer includes applying the photoresist layer over the hard mask layer.

5. The system of claim 4, wherein the photoresist layer is configured to be exposed to a light source through the first mask.

6. The system of claim 4, wherein patterning the hard mask layer includes removing any remaining portions of the photoresist layer.

7. The system of claim 4, wherein patterning the hard mask layer includes developing the photoresist layer to form a resist pattern.

8. The system of claim 1, further comprising: a mandrel material layer on the hard mask layer.

9. The system of claim 7, wherein the resist pattern is formed using the second mask.

10. The system of claim 9, wherein the mandrel material layer is configured to be etched using the resist pattern as an etch mask to form the mandrel pattern.

11. The system of claim 2, further comprising:
    a conformal layer of spacer material by atomic layer deposition (ALD) on the mandrel pattern, wherein the forming the sidewall spacer pattern on sidewalls of the mandrel pattern includes depositing the conformal layer of spacer material by atomic layer deposition (ALD) on the mandrel pattern.

12. The system of claim 11, wherein the conformal layer of spacer material is etched to form the sidewall spacer pattern.

13. The system of claim 2, wherein the hard mask layer includes an outermost component layer, a middle component layer, and an innermost layer.

14. The system of claim 13, wherein one or more hard mask component layers are chosen to permit etching of the outermost component layer without etching through the middle component layer, and to allow selective etching of the middle component layer without etching through the innermost component layer.

15. The system of claim 13, wherein patterning the hard mask layer includes patterning the outermost component layer.

16. The system of claim 15, wherein a pattern is configured to be transferred on the outermost component layer resulting from the patterning the hard mask layer, the forming the mandrel pattern, and the forming of the sidewall spacer pattern, to the middle component layer and innermost component layer by a selective etching.

17. The system of claim 16, wherein a pattern is configured to be transferred on the outermost component layer to the middle component layer and innermost component layer includes transferring the pattern on the middle component layer to the innermost component layer by selective etching that stops on the on the MR sensor layer.

* * * * *